Nov. 18, 1924.
H. BAZIN
1,516,136
GLASS DRAWING BAIT AND HOLDER FOR GLASS DRAWING MACHINES
USED IN PROCESSES OF DRAWING GLASS
Filed July 26, 1923  3 Sheets-Sheet 1
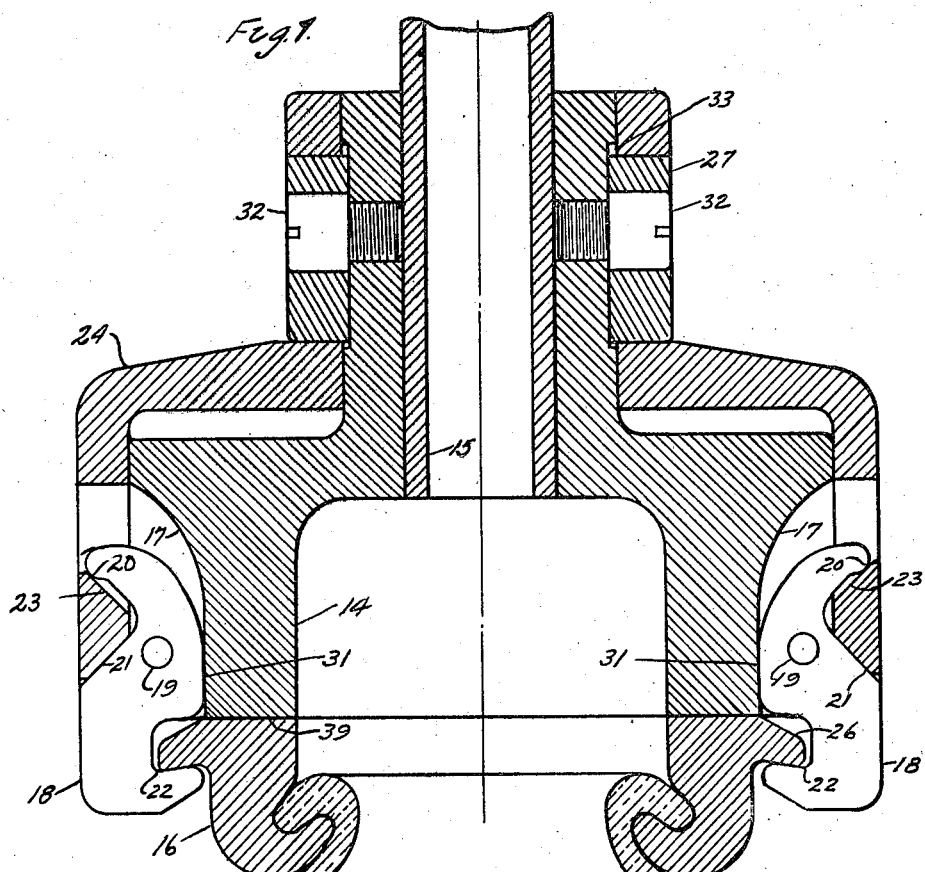
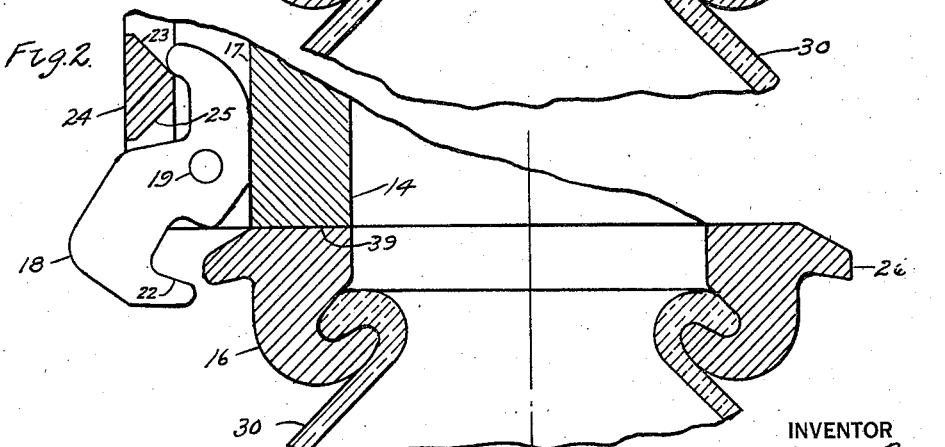
INVENTOR
Hector Bazin
BY
Geo. B. Ingersoll
ATTORNEY

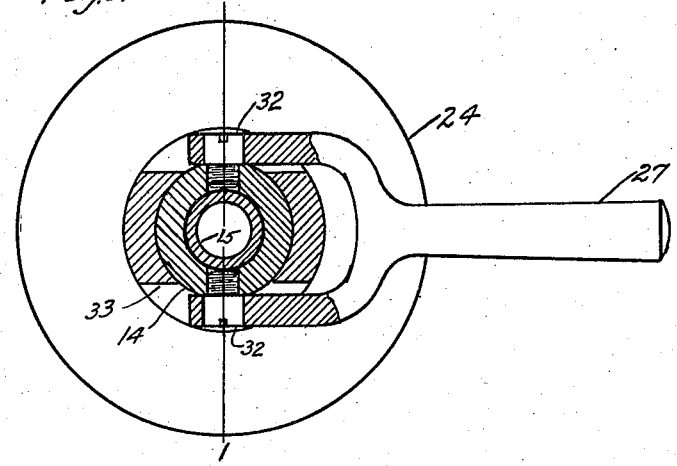
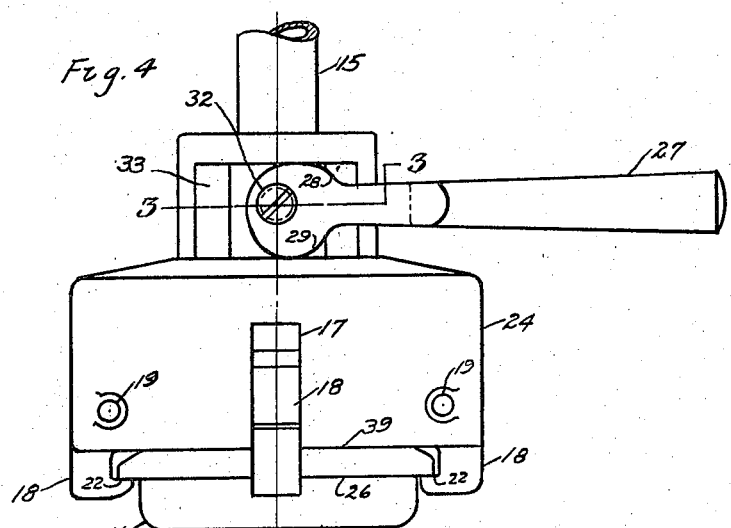
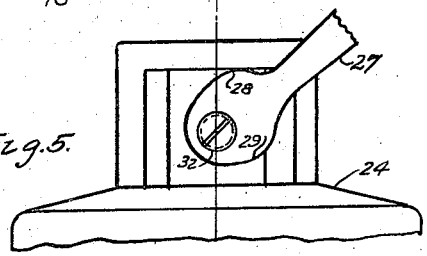

Nov. 18, 1924.  
H. BAZIN  
1,516,136  
GLASS DRAWING BAIT AND HOLDER FOR GLASS DRAWING MACHINES  
USED IN PROCESSES OF DRAWING GLASS  
Filed July 26, 1923 3 Sheets-Sheet 3
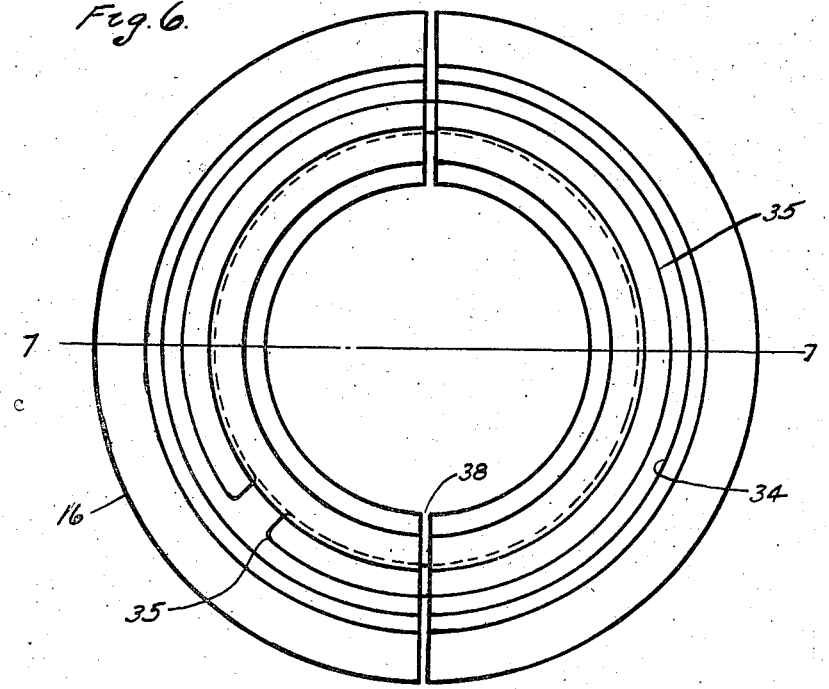
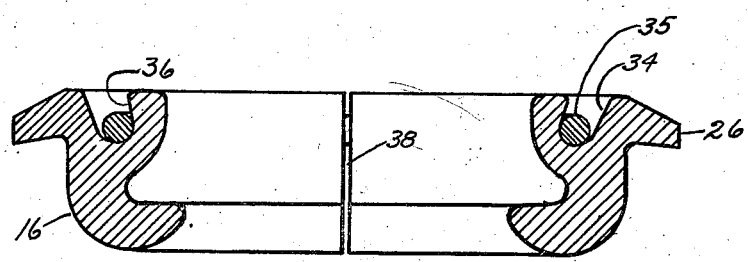
INVENTOR.  
Hector Bazin  
BY Geo. B. Ingersoll  
ATTORNEY.

Patented Nov. 18, 1924.

1,516,136

UNITED STATES PATENT OFFICE.

HECTOR BAZIN, OF DETROIT, MICHIGAN.

GLASS-DRAWING BAIT AND HOLDER FOR GLASS-DRAWING MACHINES USED IN PROCESSES OF DRAWING GLASS.

Application filed July 26, 1923. Serial No. 653,852.

*To all whom it may concern:*

Be it known that I, HECTOR BAZIN, a citizen of the United States, residing at Detroit, in the county of Wayne and State of Michigan, have invented a new and useful Improvement in Glass-Drawing Baits and Holders for Glass-Drawing Machines Used in Processes of Drawing Glass, of which the following is a specification.

My invention relates to the art of drawing glass and to improvements in glass drawing baits and bait holders.

The object of my invention is to provide a bait that can be very quickly and efficiently removed from its holder while bait still remains on the glass cylinder novel and also a bait that can be easily removed from the glass novel of cylinder without breakage of the glass novel of cylinder.

Also the object of my invention is to provide a holder that can be quickly detached not only from the solid bait or a bait made up of sections but also such a holder that in conjunction with a detachable bait of suitable design will permit of the drawing of one or more plates of glass to the end that plate glass of a very high grade may be economically manufactured.

Also the object of my invention is to permit the drawing of glass under a more uniform temperature by providing an enclosed head or holder surrounding the entrance of the air under pressure.

Also the object of my invention is to provide a device that will permit of the drawing of glass of uniform thickness thus decreasing breakage and increasing production.

In the drawings: Fig. 1 is a sectional view taken on line 1—1 of Fig. 3 showing holder and bait in an elevated position and supporting the novel of glass cylinder; Fig. 2 is a sectional view also taken on line 1—1 of Fig. 3 but showing holder after being detached from bait; Fig. 3 is a sectional view taken on line 3—3 of Fig. 4; Fig. 4 is a side elevation of holder and bait attached and showing relative position of operating lever; Fig. 5 shows position of operating lever when holder and bait are detached; Fig. 6 is a plan view of a bait made up of sections and held together by means of a snap ring; and Fig. 7 is a sectional view of bait ring on line 7—7 of Fig. 6.

Like numerals refer to same parts in all figures.

The drawing head or holder 14 is suitably fastened to the compressed air or medium pipe 15, and is also recessed so as to form, with the bait ring 16, an enclosed passage way for the compressed air or medium. Suitable recesses or grooves 17 are made in holder 14, in which are fitted rocker arms 18, which operate on shafts 19; shafts 19 being fastened in holder 14. Rocker arms 18 have actuated faces 20 and 21 and a supporting face 22. Actuating face 20 of rocker arm 18 contacts with an actuating face 23 on sliding collar 24 while actuated face 21 on rocker arm 18 contacts with an actuating face 25 on sliding collar 24, and supporting face 22 on rocker arm 18 contacts with the face of a shoulder 26 on bait ring 16. Sliding collar 24 is actuated to a sliding movement on holder 14 by means of a lever 27 which has two actuating faces 28 and 29 which alternately contact with adjacent actuated faces on sliding collar 24.

When lever 27 is in position as shown in Fig. 4, actuating face 29 lowers sliding collar 24, which in turn through its actuating faces 25 force rocker arms 18 into a position as shown approximately in Figures 1 and 4, thus rigidly supporting and holding bait ring 16 which in turn holds novel 30 of glass cylinder. Also when lever 27 is moved to the position shown in Fig. 5 actuating face 28 raises sliding collar 24 which in turn through its actuating faces 23 force rocker arms 18 into a position as shown approximately in Fig. 2 thus allowing holder 14 and its attached parts to be easily moved and allowing bait or ring to remain in its original position on novel of glass cylinder. It is to be noted that rocker arms 18 are forced to a solid and rigid contact with holder 14 at points 31.

Lever 27 is suitably attached to and supported on holder 14 by pins or shafts 32 which allow lever 27 to oscillate about suitable centers and sliding collar 24 is suitably cut away as shown at 33 to allow for the assembly of lever 27 and pins or shafts 32.

Whereas Figures 1, 2 and 4 show a bait or ring of a solid section, my invention also comprises the optional use of a bait or ring 16 made in sections as shown in Figures 6 and 7. Each section is made with a shoulder 26 which will contact with supporting faces 22 on rocker arms 18.

Solid or sectional bait or ring 16 is to have a continuous interior ledge with an inclined or curved or horizontal surface as will support best the novel or attaching drawing end of the glass cylinder and allow the easy removal of each section from the novel of the glass cylinder.

Bait or ring sections 16 are made with a continuous and internal groove 34 in which lies a snap ring 35 which will bear against the inwardly inclined wall 36 of groove 34 and prevent sections from falling apart before attaching to holder and after detachment from holder and while still on novel of glass cylinder; and also allow bait or ring sections to yield or displace themselves radially against the pressure of snap ring 35 sufficiently to accommodate any differences in the expansions of the bait or ring material and the glass novel or cylinder as shown approximately at one point 38. Groove 34 may be enlarged at certain points to allow for the introduction of a tool for the removal of snap ring 35.

It is to be noted that bait or ring sections 16 are to be made of such dimensions as will allow a very close contact with holder 14 at 39 in Figures 1, 2 and 4 as will form a sufficiently enclosed chamber or passage for the blowing of compressed air or medium and at the same time as will allow the bait or ring sections to displace radially to accommodate for expansion forces in novel and bait or ring sections.

It is also to be noted that the bait or ring and bait or ring sections may be made of malleable iron or any suitable material as will allow of its use either in a cold or heated condition. It is to be understood that other means and devices may be resorted to for holding sections of bait or ring together and attaching or detaching ring or bait to holder, and I do not confine myself to this specific set of details but consider myself at liberty to make such detail changes as will not depart from the principles of my design and invention.

Having described my invention, I claim:

1. A combination of a bait for drawing glass, comprising a continuous element, sectionally constructed, and a tension or spring member holding said sections in contact with each other and in contact with glass novel.

2. A bait for drawing glass, comprising a continuous element, sectionally constructed, and a tension or spring member for holding said sections in contact with each other and with a glass novel, said element having a novel supporting surface, and a recessed groove with inclined sides, said groove being so located as to exclude the molten glass when the bait is assembled in its attaching holder.

3. A bait for drawing glass, comprising a continuous element, sectionally constructed, and a tension or spring member holding said sections in contact with each other and with a glass novel, said element having a novel supporting surface, and a recessed groove with inclined sides, and a surface capable of contacting with supporting members on bait holder.

4. A bait for drawing glass, comprising a continuous element, sectionally constructed, and a tension or spring member holding said sections in contact with each other and with a glass novel, said element having a novel supporting surface, a recessed groove with inclined sides, and a surface capable of contacting with supporting members on a bait holder, and so constructed as to form in its assembly with the bait holder, a continuous and enclosed passage for the entrance of a compressed medium for blowing glass.

5. In a glass drawing head, a pivoted lever with a bait supporting surface, and a surface adapted to limit the pivotal motion of the said lever, by contacting with the said drawing head, and a surface adapted to receive a thrust force operating said lever to a bait supporting position, and a surface adapted to receive a thrust force operating said lever away from a bait supporting position.

6. In a glass drawing head, an external sliding collar having a triangular shaped section located between openings in the collar wall, said triangular shaped section having surfaces adapted to operate a pivoted lever.

HECTOR BAZIN.